(12) United States Patent
Jarrett

(10) Patent No.: US 10,981,815 B1
(45) Date of Patent: Apr. 20, 2021

(54) ONE PIECE WATERTIGHT CONCRETE STRUCTURE

(71) Applicant: Jarrett Concrete Products, Ashland City, TN (US)

(72) Inventor: Thomas Henry Jarrett, Ashland City, TN (US)

(73) Assignee: Jarrett Concrete Products, Ashland City, TN (US)

( * ) Notice: Subject to any disclaimer, the term of this patent is extended or adjusted under 35 U.S.C. 154(b) by 0 days.

(21) Appl. No.: 16/674,471

(22) Filed: Nov. 5, 2019

Related U.S. Application Data

(62) Division of application No. 15/223,600, filed on Jul. 29, 2016, now Pat. No. 10,501,349.

(60) Provisional application No. 62/318,887, filed on May 31, 2016.

(51) Int. Cl.
*C02F 3/28* (2006.01)
*B28B 23/02* (2006.01)
*B28B 1/14* (2006.01)

(52) U.S. Cl.
CPC .............. *C02F 3/2866* (2013.01); *B28B 1/14* (2013.01); *B28B 23/02* (2013.01); *C02F 2203/006* (2013.01)

(58) Field of Classification Search
CPC .. C02F 3/2866; C02F 2203/006; B28B 23/02; B28B 1/14
USPC ........... 52/169.6, 169.7, 260, 258, 251, 259, 52/741.4, 741.41, 742.14
See application file for complete search history.

(56) References Cited

U.S. PATENT DOCUMENTS

| | | | | |
|---|---|---|---|---|
| 1,267,495 A | * | 5/1918 | Babich ................... | E04H 13/00 52/135 |
| 3,263,378 A | * | 8/1966 | Dorris ..................... | H02G 9/10 52/20 |
| 4,389,831 A | * | 6/1983 | Baumann ................ | E04B 1/344 249/34 |
| 4,826,644 A | * | 5/1989 | Lindquist ................ | B28B 7/22 264/256 |

(Continued)

*Primary Examiner* — Brent W Herring
(74) *Attorney, Agent, or Firm* — W & C IP

(57) ABSTRACT

A manufacturing process for a one piece tank that involves three steps results in a consistently watertight and structurally stronger unit than previous tanks. The three steps comprise a process for producing the body of the tank, a process for producing a preliminary lid, and a process for producing the final tank. An important step in the process for producing the body of the tank is extending reinforcing steel (rebar) a distance above the concrete walls of the tank. After the preliminary lid is placed into a groove of the tank, the rebar is bent over the lid and a water stop is applied between the walls of the tank and the preliminary lid. The water stop can be any of several forms. In one form, the water stop is in the form of butyl or rubber strip which projects from the walls of the tank above the walls with the rebar. In an alternate form, the water stop is in the form of a gasket of plastic or other suitable material inserted in a groove at the top of the tank. Once the preliminary lid is in place and the rebar bent over the preliminary lid, reinforcing steel (rebar) is bent over the preliminary lid and secured to proper locations. Then concrete is poured to the top and above the sidewalls of the tank until completely full. The resulting cured structure is a one piece water tight tank with an integral water stop.

7 Claims, 5 Drawing Sheets

(56) References Cited

U.S. PATENT DOCUMENTS

| | | | | |
|---|---|---|---|---|
| 4,869,033 A | * | 9/1989 | Duvieusart | E04H 7/18 52/169.6 |
| 4,961,293 A | * | 10/1990 | House | B65D 88/76 52/21 |
| 4,963,082 A | * | 10/1990 | Lindquist | B28B 7/22 249/167 |
| 5,090,713 A | * | 2/1992 | Johnson | E02D 29/14 277/648 |
| 5,152,635 A | * | 10/1992 | Ziu | E02D 29/12 405/129.55 |
| 5,285,914 A | * | 2/1994 | Del Zotto | B65D 90/24 220/4.12 |
| 5,495,695 A | * | 3/1996 | Elliott, Jr. | B65D 88/76 220/565 |
| 5,582,310 A | * | 12/1996 | Del Zotto | B65D 90/24 220/23.9 |
| 5,656,766 A | * | 8/1997 | Horn | B65D 88/76 73/40.5 R |
| 5,672,506 A | * | 9/1997 | Aoyagi | B29C 70/00 435/289.1 |
| 5,778,608 A | * | 7/1998 | Elliott, Jr. | B65D 88/76 220/565 |
| 5,881,760 A | * | 3/1999 | Del Zotto | B65D 88/76 137/264 |
| 6,196,761 B1 | * | 3/2001 | Stanton | B60S 5/02 137/312 |
| 6,637,976 B2 | * | 10/2003 | Stanton | B60S 5/02 220/567.2 |
| 8,297,006 B2 | * | 10/2012 | Watson | E02D 27/016 52/169.7 |
| 8,307,604 B2 | * | 11/2012 | Stepanian | H02G 9/10 52/745.02 |
| 8,484,928 B2 | * | 7/2013 | Muller | E04B 1/161 52/742.14 |
| 9,464,451 B1 | * | 10/2016 | Skaw | E04H 7/18 |
| 10,189,731 B2 | * | 1/2019 | Weed | E03F 5/18 |
| 10,501,349 B1 | * | 12/2019 | Jarrett | C02F 3/1242 |
| 2008/0302057 A1 | * | 12/2008 | Muller | E04B 1/161 52/745.1 |
| 2009/0282754 A1 | * | 11/2009 | Watson | E02D 27/013 52/169.6 |
| 2016/0376177 A1 | * | 12/2016 | Weed | A61C 13/082 210/170.01 |
| 2019/0271134 A1 | * | 9/2019 | Chudley | B32B 27/20 |
| 2019/0284778 A1 | * | 9/2019 | Fagan | B32B 5/16 |
| 2019/0321149 A1 | * | 10/2019 | Weed | B65D 88/76 |

* cited by examiner

ONE PIECE WATERTIGHT CONCRETE STRUCTURE

CROSS-REFERENCE TO RELATED APPLICATION

This application is a continuation of U.S. patent application Ser. No. 15/223,600 filed Jul. 29, 2016, now U.S. Pat. No. 10,501,349, which claimed priority to U.S. Provisional Patent Application Ser. No. 62/318,887 filed May 31, 2016, by Thomas Henry Jarrett for "One Piece Watertight Concrete Structure.

BACKGROUND OF THE INVENTION

Field of the Invention

The present invention generally relates to concrete structures used in onsite sewage facilities (OSSFs) and, more particularly, to a one piece watertight concrete structure having specific application as a septic tank in an OSSF and to a method of manufacture of a one piece watertight concrete structure.

Background Description

A septic tank is a key component of a small-scale sewage treatment system common in areas that lack connection to main sewage pipes provided by local government or private corporations. The term "septic" refers to the anaerobic bacterial environment that develops in the tank which decomposes the waste discharged into the tank.

Precast concrete tanks have been manufactured for over 50 years for use in wastewater and related industries. Initially, these tanks were manufactured in several pieces with the pieces sealed at the job site. As watertight regulations increased, tank production evolved to top seamed tanks that are sealed at the manufacturer. While this is an improvement, it is still not a guarantee that the tanks would not leak. Leaks might be caused by shifting soil, high water tables, and internal water testing pressure.

SUMMARY OF THE INVENTION

It is therefore an object of the present invention to provide a method of producing precast concrete tanks that results in a one piece watertight tank with no joints to seal.

According to the invention, there is provided a manufacturing process that involves three steps and results in a consistently watertight and structurally stronger unit than previous tanks. The three steps comprise a process for producing the body of the tank, a process for producing a preliminary lid, and a process for producing the final tank. An important step in the process for producing the body of the tank is extending reinforcing steel (rebar) a distance, on the order of 18", above the concrete walls of the tank. When the preliminary lid is placed into a groove of the tank, the rebar is bent over the preliminary lid and a water stop is applied between the walls of the tank and the preliminary lid. The water stop can have any of several forms. In one form, the water stop is in the form of butyl or rubber strip which projects from the walls of the tank above the walls with the rebar. In an alternate form, the water stop is in the form of a gasket of plastic or other suitable material inserted in the groove of the tank. Once the preliminary lid is in place and the rebar bent over the preliminary lid, reinforcing steel (rebar) is placed on the preliminary lid and secured to proper locations. Then concrete is poured to the top and above the sidewalls and endwalls of the tank until completely full. The resulting cured structure is a one piece water tight tank with an integral water stop.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION THE INVENTION

Figure 1:
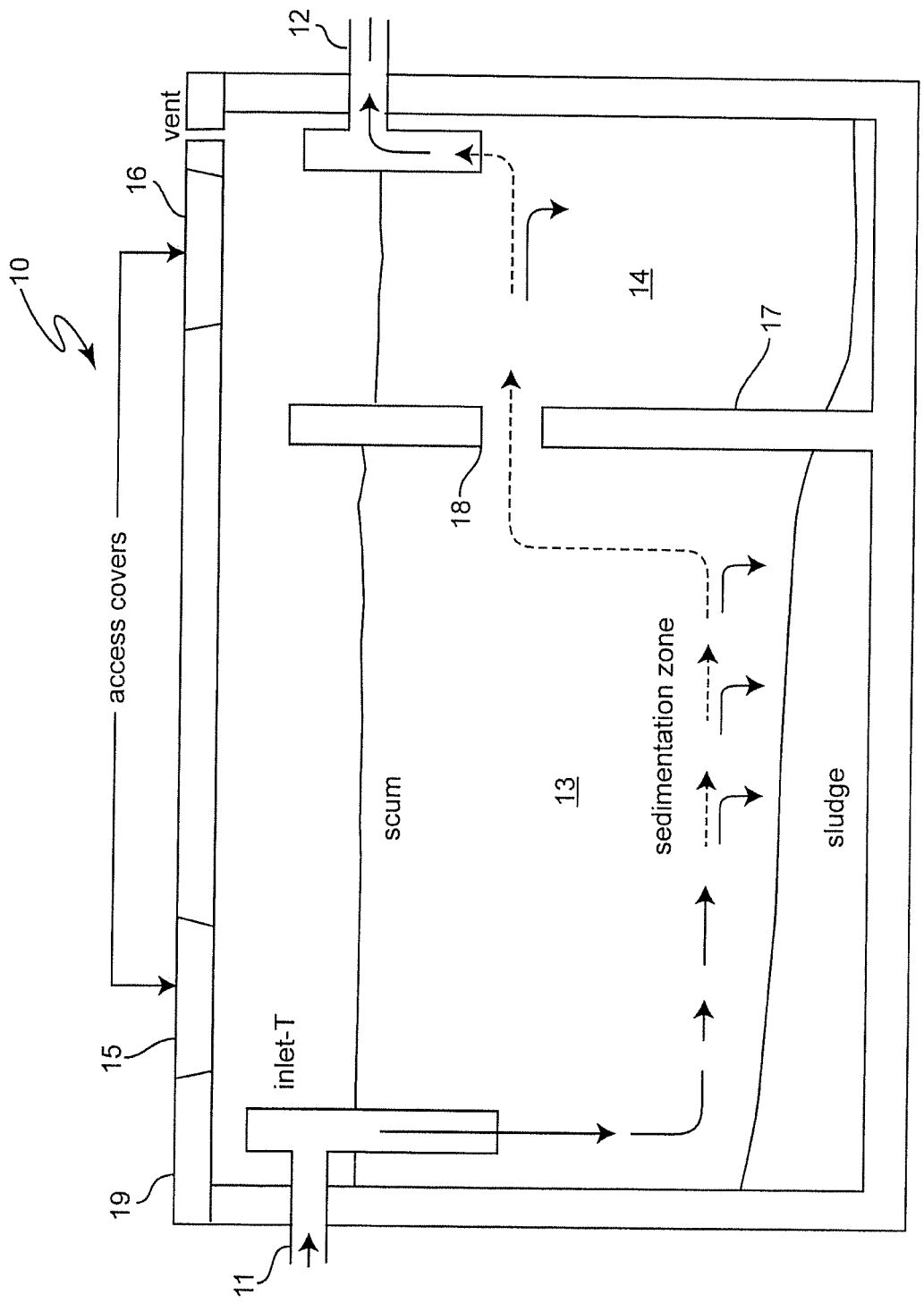
FIG. 1 is a cross-sectional view of a typical septic tank known in the prior art.

Referring now to the drawings, and more particularly to FIG. 1, there is shown in cross-section a conventional septic tank 10. One end of the tank 10 is connected to an inlet waste water pipe 11 and the other end to an outlet pipe 12 that is connected to a septic drain field. Generally, these pipe connections are made with a "T" pipe allowing liquid to enter and exit without disturbing any crust on the surface. The tank usually incorporates two chambers 13 and 14, each equipped with, e.g., a manhole cover 15 and 16 and separated by a dividing wall 17 with openings 18 located about midway between the floor and roof of the tank.

Wastewater enters the first chamber 13 of the tank, allowing solids to settle and scum to float. The settled solids are anaerobically digested, reducing the volume of the solids. The liquid component flows through the dividing wall 17 into the second chamber 14 where further settlement takes place. The excess liquid, now in a relatively clear condition, then drains from the outlet 12 into the septic drain field.

The problem solved by the present invention relates to the manner in which the lid 19 is attached to the bottom of the tank. On the one hand, the lid and tank have been sealed at the job site, but the quality and integrity of the seal varied greatly. An improvement resulted in the seal being made by the manufacturer, assuring a more uniform quality of the seal. Even so, the resulting structure is inherently a two-piece structure having a seal that can, under certain conditions, leak. For example, the seals might leak due to shifting soil as a result of a load, such as a truck or other heavy equipment passing over the site where the tank is buried, high water tables, and internal water testing pressure.

Figure 2:
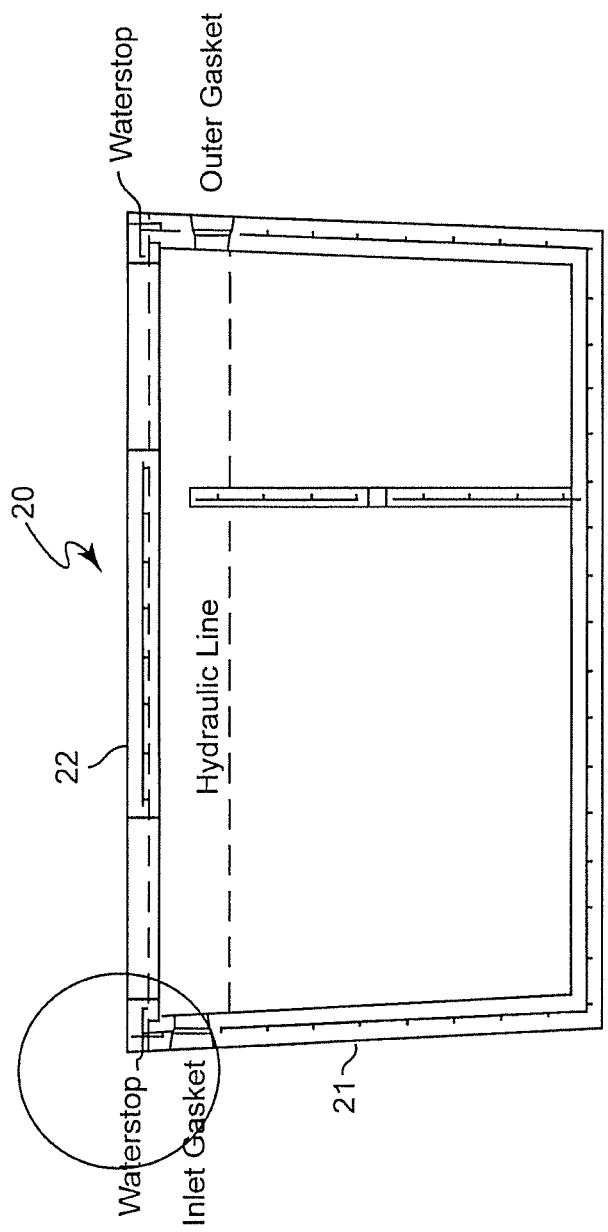
FIG. 2 is a cross-sectional view of the precast concrete septic tank manufactured according to the present invention.
Figure 3:
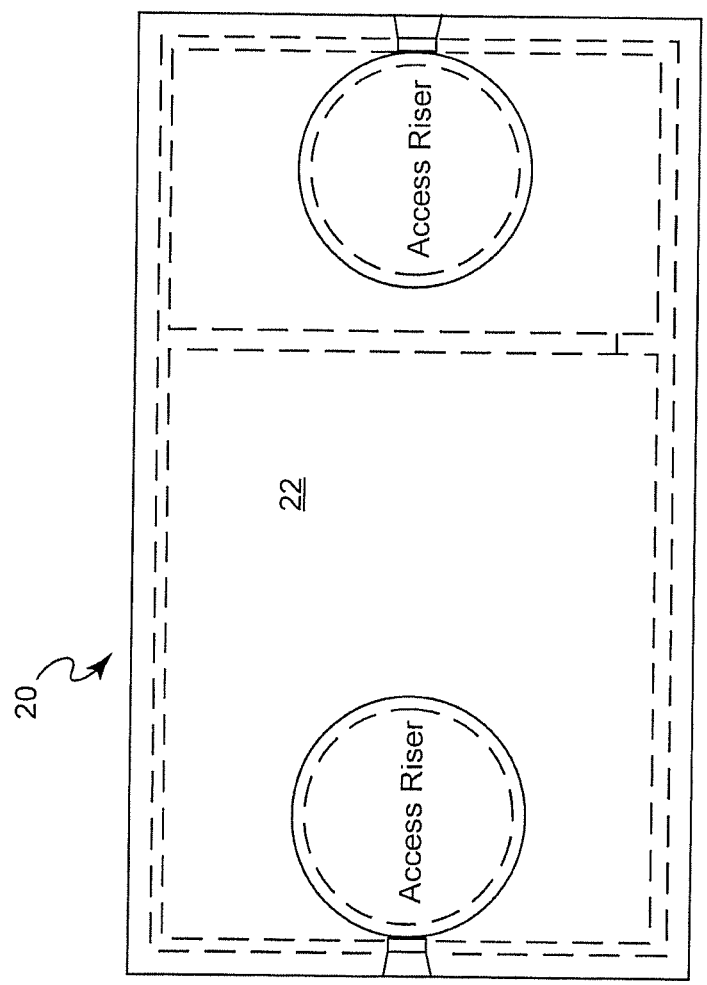
FIG. 3 is a plan view of the precast concrete septic tank manufactured according to the present invention.

The solution to this problem according to the present invention is a method of manufacturing a one piece precast concrete tank which is water tight and structurally stronger than conventional tanks and therefore resistant to shifting soil, high water table of internal water testing pressure. A tank manufactured according to the present invention is illustrated in FIGS. 2 and 3, to which reference is now made.

Figure 4:
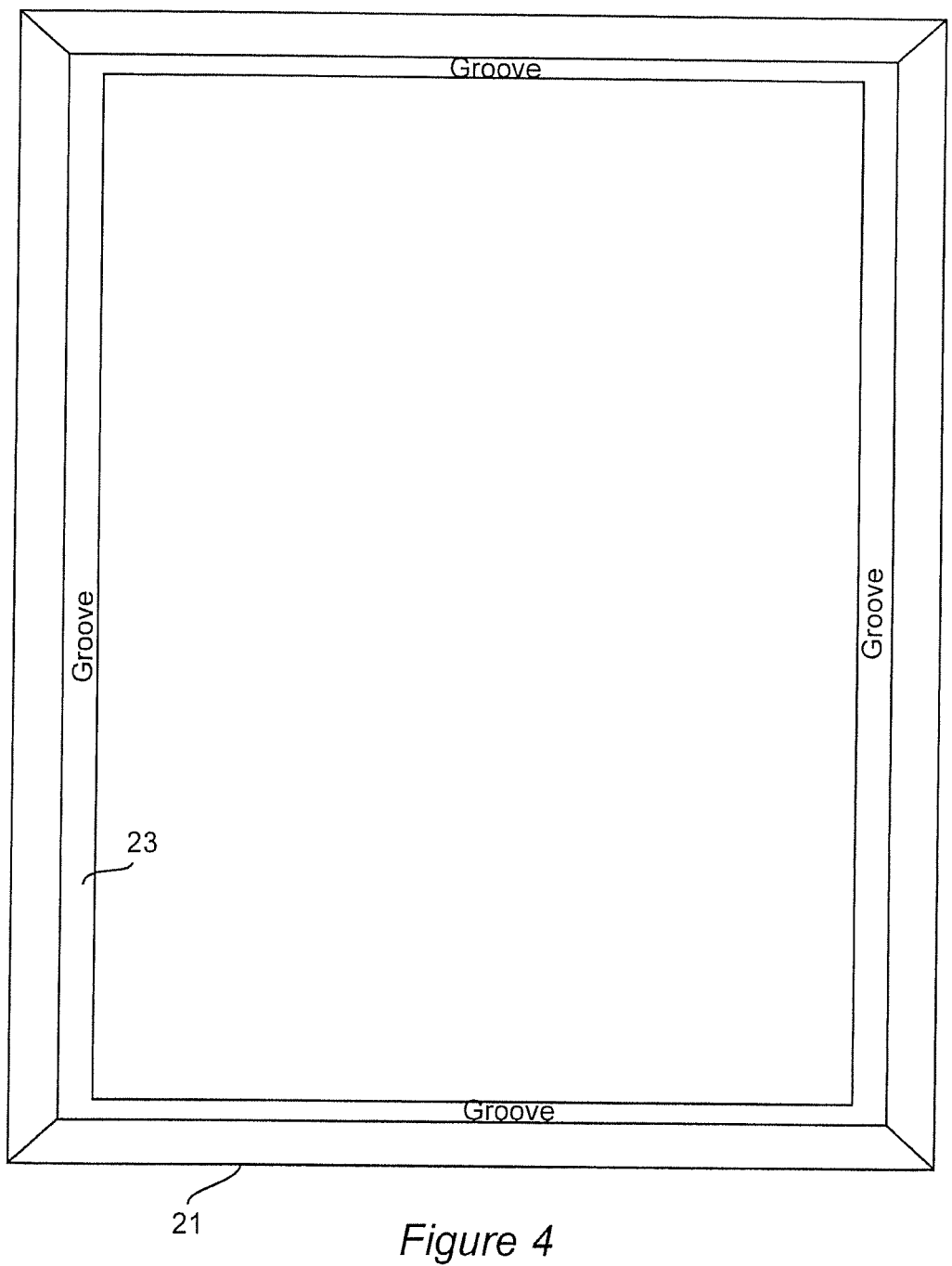
FIG. 4 is a simplified plan view of the tank body as manufactured according to the first step in the process according to the invention.

As shown in these figures, the completed one piece tank 20 comprises a tank body 21 integral with a tank lid 22. The method of making this one piece tank begins with the process of producing the body of the tank. This process includes preparing the tank form, which involves cleaning and oiling the form to facilitate release of the tank body after the concrete has cured. Reinforcing steel (rebar) is placed into the outside jacket form. At least some of the rebar extends on the order of 18" above the finished edge of the tank body. Hole formers, for inlet and outlet holes, and adapters are placed in proper locations. Then the core form is placed inside the outer jacket form. Once the core form is in place and all latches and fasteners are checked for security, concrete is poured into the form to the proper level. Concrete is preferably of no less than 4500 psi is used in forming the body of the tank and preferably the body of the tank is formed to be at least four inches thick. FIG. 4 is a simplified plan view of the top of the body of the tank 21 showing a groove 23 formed in the upper edges of the side walls of the tank body.

The second step of the method of manufacturing the tank according to the invention is the process of preparing the preliminary lid. The lid form is prepared by cleaning and oil to facilitate the release of the cured preliminary lid. Hole formers, for the manholes and other holes, are placed in the lid form along with risers and/or adapters in proper locations for access. Rebar is placed in th preliminary lid form. Concrete of no less than 4500 psi is then poured to a level of about half that of the finished lid and allowed to cure.

The final step in the method according to the invention is the processing of the final tank. After the tank body has cured, the core of the form is removed. The preliminary lid is removed from the lid form and placed into the groove 23 of the tank body. After setting the preliminary lid in the groove, the rebar is bent over the lid.

Figure 5A:
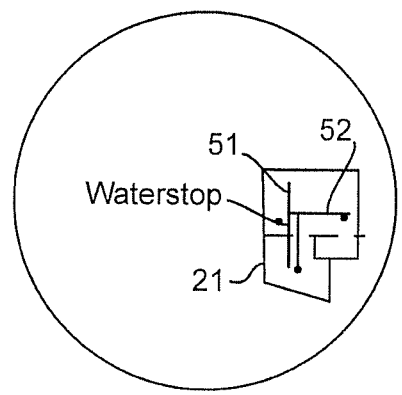
FIG. 5A is an enlarged partial cross-sectional view showing the water stop according to one embodiment of the invention.

An important feature of the invention is the formation of the water stop where the lid joins the body of the tank. In one embodiment shown in FIG. 5A, the water stop is in the form of a butyl or rubber strip 51. This strip is placed in the tank body form about the top edge and extends above the top edge of the poured concrete. As shown in FIG. 5A, the strip 51 extends above the edge of the tank 21 adjacent to the rebar 52 which is bent over the preliminary lid. Alternatively, a plastic band or gasket can be inserted into the top of the concrete. At this point, reinforcing steel (rebar) is bent over the preliminary lid and secured to proper locations. Then, concrete is poured on the top and above the sidewalls and end walls of the tank body, so that the water stop is fully incorporated into the resulting one piece unit with no joints to seal.

Figure 5B:
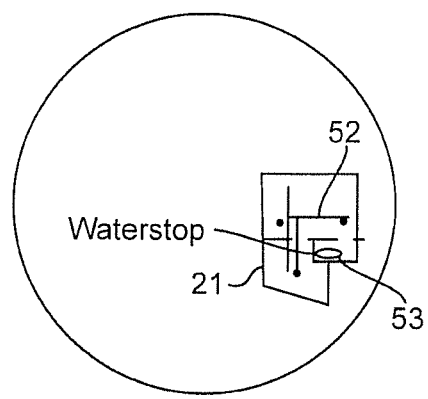
FIG. 5B is an enlarged partial cross-sectional view showing the water stop according to an alternate embodiment of the invention.

In an alternate embodiment, as shown in FIG. 5B, a gasket 53 of plastic or suitable material is first formed in the groove 23 of the tank body before the preliminary lid is set into the groove. Once the preliminary lid is placed in the groove, the rebar 52 is bent over the preliminary lid and reinforcing steel (rebar) is placed onto the preliminary lid and secured to proper locations. Then, concrete is poured to the top and above the sidewalls and end walls of the tank body, so that the water stop is fully incorporated into the resulting one piece unit with no joints to seal.

While the invention has been described in terms of preferred embodiments, those skilled in the art will recognize that the invention can be practiced with modification within the spirit and scope of the appended claims.

The invention claimed is:

1. A manufacturing process producing a one piece watertight precast concrete tank comprising the steps of:
    producing a body of the tank having side walls and end walls by pouring concrete into a space between a tank form and a core into which reinforcing steel has been placed, the reinforcing steel extending a predetermined distance above a finished level of the side walls and end walls of the body of the tank, the body of the tank being formed with a groove about an upper edge of the side walls and end walls of the body of the tank;
    producing a preliminary lid by pouring concrete into a form to a first level which is less than a finished thickness of a lid; and
    producing a final tank by placing the preliminary lid in the groove formed about top edges of the side walls and end walls of the body of the tank and bending the reinforcing steel over the preliminary lid and adding additional reinforcing steel to the preliminary lid before pouring concrete on top of the preliminary lid and above the side walls and end walls of the body of the tank until the form is completely full.

2. The manufacturing process according to claim 1, wherein a water stop is formed by incorporating a strip of water impervious material into the top edges of the side walls and end walls of the body of the tank and projecting above the top edges of the side walls and end walls, the projection of the strip of water impervious material being incorporated into a finished top when the concrete is poured over the preliminary lid.

3. The manufacturing process according to claim 2, wherein the water impervious material is butyl or rubber.

4. The manufacturing process according to claim 1, wherein a water stop is formed by applying a gasket of water impervious material to the groove of the body of the tank before placing the preliminary lid in the groove of the body of the tank.

5. The manufacturing process according to claim 1 wherein the producing the body of the tank step is performed by using concrete of at least 4500 psi when pouring the concrete.

6. The manufacturing process according to claim 1 wherein the space in the first producing step is at least four inches wide so as to produce the tank body having the side walls and end walls at least four inches thick.

7. The manufacturing process according to claim 1 further comprising a step of incorporating a water stop in the body of the tank and the lid outside of the reinforcing steel which extends from the body of the tank and is bent inward in the lid.

* * * * *